Feb. 26, 1957  E. G. GOODWIN  2,782,872
BRAKE RIGGING
Filed March 10, 1950  3 Sheets-Sheet 1

INVENTOR.
ERNEST G. GOODWIN,
BY
Ritter, McEllen & Muir
ATTORNEYS

Feb. 26, 1957 E. G. GOODWIN 2,782,872
BRAKE RIGGING
Filed March 10, 1950 3 Sheets-Sheet 2
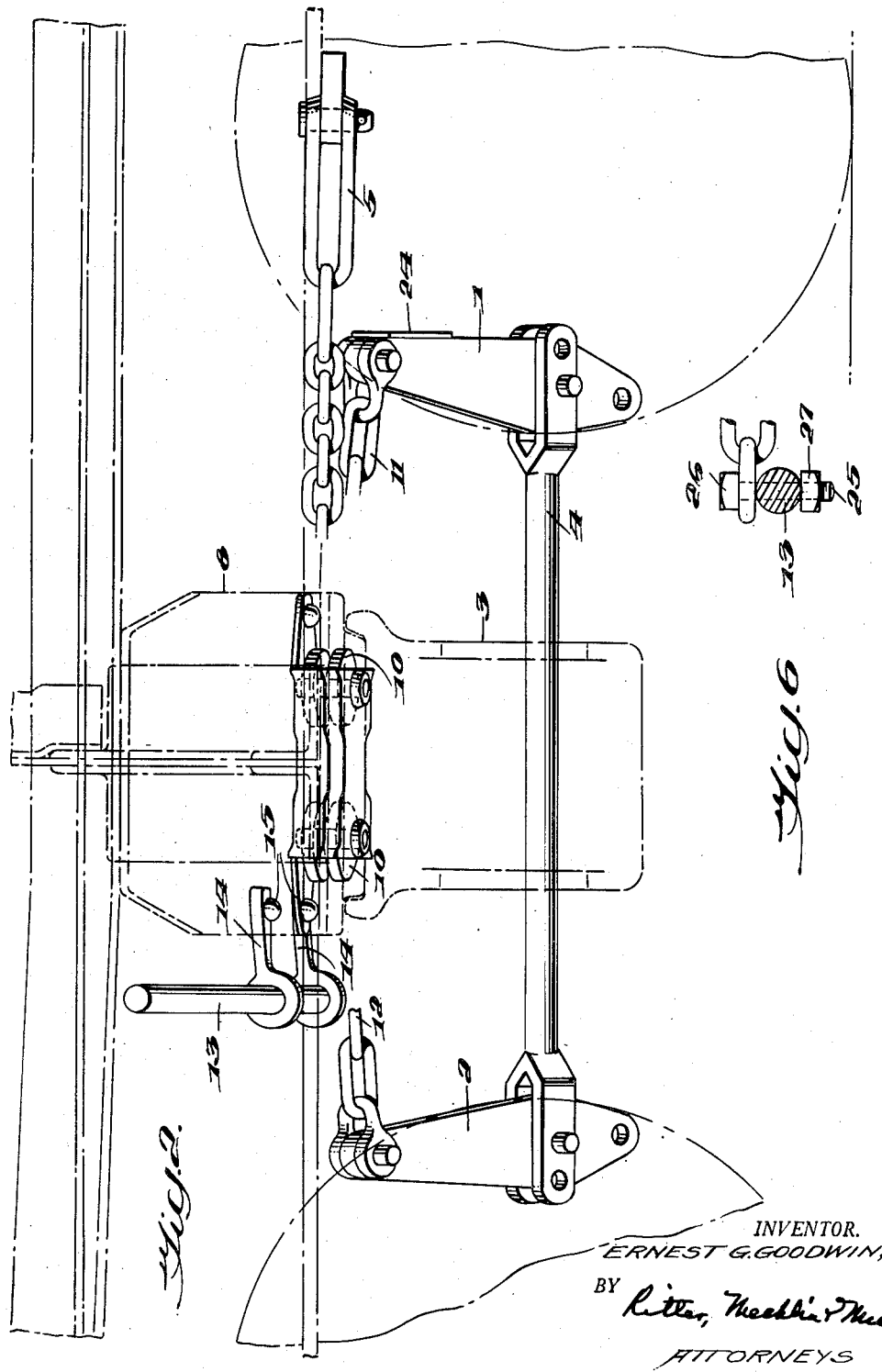
INVENTOR.
ERNEST G. GOODWIN,
BY
ATTORNEYS

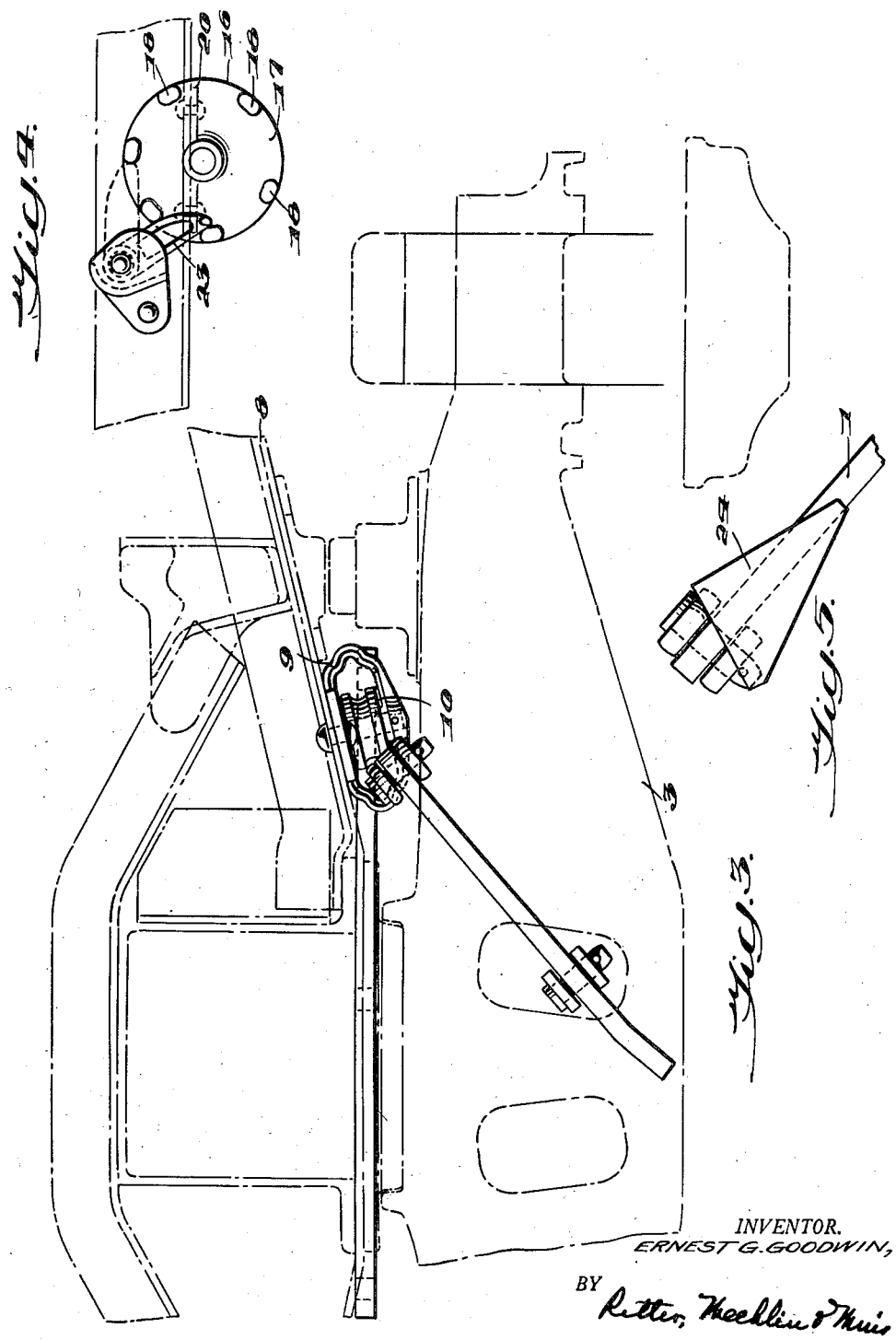

United States Patent Office 2,782,872
Patented Feb. 26, 1957

2,782,872

BRAKE RIGGING

Ernest G. Goodwin, Toledo, Ohio, assignor to Unitcast Corporation, Toledo, Ohio, a corporation of Ohio Application March 10, 1950, Serial No. 148,861

6 Claims. (Cl. 188—33)

My invention relates to railway cars and more particularly to improvements in the brake rigging thereof.

As is known, the brake rigging now most commonly used on railway freight cars employs a pull rod or the like which passes over the bolster of the car truck.

In a brake rigging of such a construction it is not possible to anchor the dead lever thereof to the underframe of the car but, as has been the customary practice, the dead lever is connected to the bolster of the car truck at a point eccentric to the pivotal axis of the truck. Transmission of the braking force to the truck bolster imparts to the truck eccentric forces tending to rotate it relatively to the car underframe, thus moving the truck as a whole out of square and some of its parts out of their normal operating position. This, of course, results in abnormal wear of some of the truck parts and, by reason of the force tending to swivel the truck, pressure between a flange of the leading wheels of the truck against the rail on which the truck is moving is materially increased.

The principal object of the invention is, therefore, to provide a brake rigging for railway freight cars in which the dead lever of the rigging is connected to the underframe of the car to eliminate the eccentric forces customarily imparted to the truck and yet enable the brake rigging to operate as though a part thereof extended above the bolster of the car truck.

The primary feature of the invention consists in providing the brake rigging with a pair of sheaves for respectively receiving chains connected to the live and dead levers by which these levers may be actuated to apply the brakes.

Another feature of the invention consists in providing the brake rigging with a pair of sheaves mounted on the underside of the body bolster.

Other and more specific features of the invention, residing in advantageous forms, combinations and relations of parts, will hereinafter appear and be pointed out in the claims.

In the drawings,

Figure 2 is a side elevational view of the construction shown in Figure 1, additionally showing in dot and dash lines the bolster of the railway car truck.

Figure 3 is an end elevational view of a construction similar to Figure 2 but additionally showing a side frame of the railway car truck in the same manner as the truck bolster.

Figure 4 is an end elevational view of that portion which projects beyond the side of the car for taking up undesired slack in the brake rigging.

Figure 5 is an end elevation of the live lever of the brake rigging showing the plate applied to its upper end to prevent its entanglement with other portions of the brake rigging.

Figure 6 is a sectional view taken on a line corresponding to line 6—6 of Figure 1.

Figure 1:
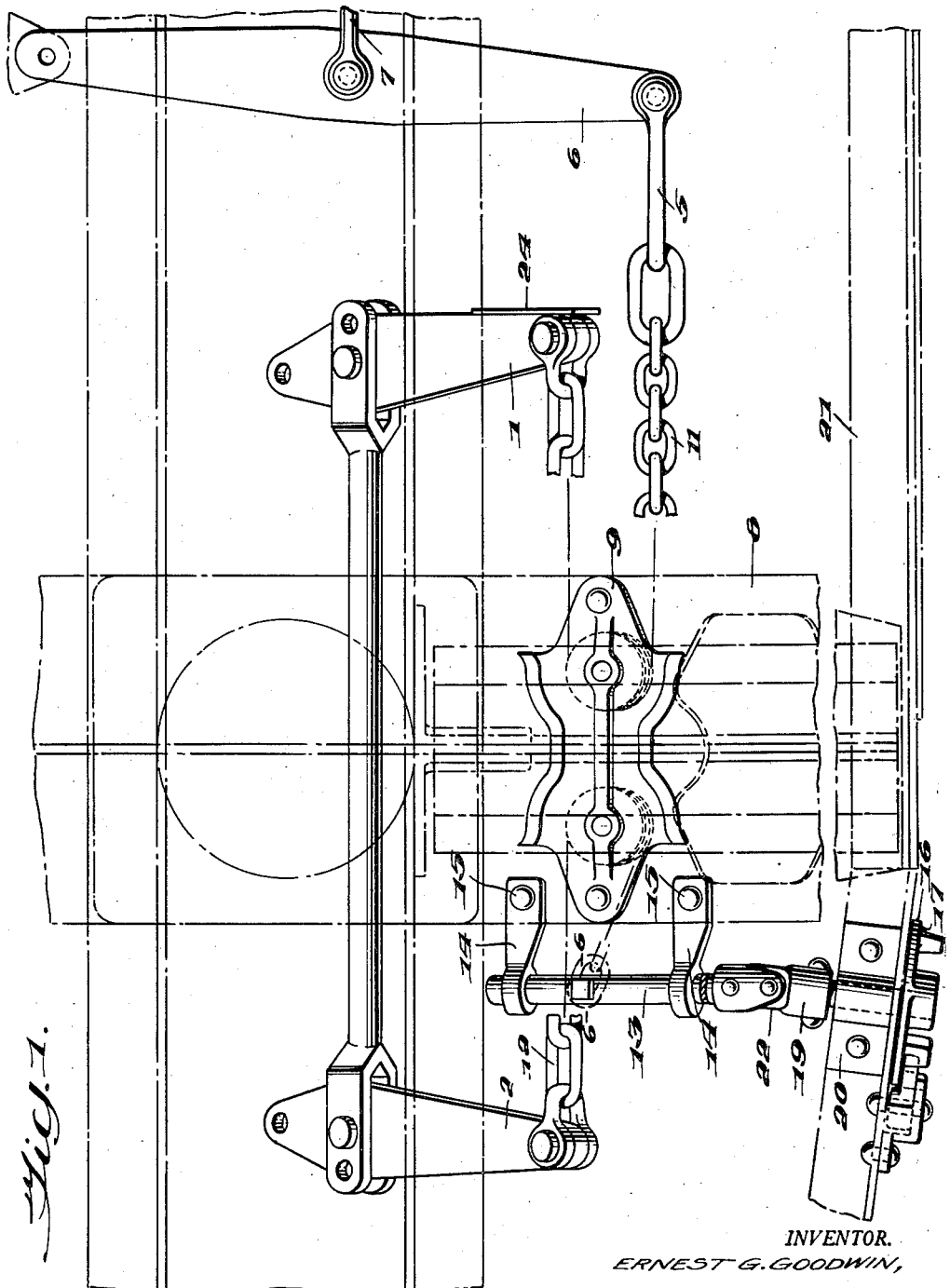
Figure 1 is a plan view of the invention with portions of the car shown in dot and dash lines.

In the drawings illustrating the invention, 1 indicates the live lever and 2 the dead lever of the brake rigging of a railway car. As is known, these two levers are pivotally mounted on respectively opposite sides of the truck bolster 3 which is shown in the drawings in dot and dash lines.

Intermediate their ends the two levers are connected by a compression rod 4 which extends through suitable openings in the side walls of the truck bolster 3. As will be appreciated by those skilled in the art, the lower ends of the two levers are adapted to be pivotally connected to brake beams (not shown). The levers are actuated by a pull rod or the like 5 pivotally connected to a fulcrum or floating lever 6 to which force is transmitted from the conventional brake cylinder (not shown) through a rod or the like 7.

Rigidly secured to the under-side of the body bolster 8 of the car is a housing 9 having a pair of sheaves 10. Passing around one sheave is a chain 11 connecting the pull rod 5 with the upper end of the live lever. Passing around the other sheave is a chain 12 connecting the upper end of the dead lever to a shaft 13 which is rotatably mounted on the body bolster 8 in suitable bearings 14 which are rigidly secured to the body bolster by rivets or the like 15. By providing sheaves with chains connected to the live and dead levers a reversal of forces normally imparted to these levers is obtained with the result that the upper end of the dead lever may be attached to the underframe of the car and the braking forces are, therefore, not imparted to the truck bolster 3.

Adjustment of the brake rigging for the taking up of slack which occurs therein because of wear in the parts of the brake rigging is made by winding that portion of chain 12 connected to shaft 13 around the shaft. It has been found that the desired amount of slack is taken out of the brake rigging by chain 12 merely wrapping once around shaft 13.

Shaft 13 is actuated by a capstan element 16 comprising a disk portion 17 provided with a plurality of outwardly projecting lugs or studs 18 and an inwardly extending shaft 19 which is rotatably mounted in a suitable bearing 20 secured to the side sill 21 of the car. As shaft 19 is disposed in a substantially horizontal position while shaft 13 inclines upwardly in conformity with the inclination of the under-side of the body bolster 8, the inner end of shaft 19 is connected to the outer end of shaft 13 by a suitable universal joint 22.

Pivotally mounted on the outside of the upstanding leg of the side sill 21 is a dog or pawl 23 for engaging the outwardly projecting lugs 18 of the disk 17 to prevent undesired movement of shafts 19 and 13.

As viewed in Figure 4, the left side of dog 23 is plain while the right side thereof is preferably convex. This enables both sides of the dog to be engaged by the outwardly extending legs 18 to prevent movement of the shafts 19 and 13. As seen in dotted lines in Figure 4, the dog 23 is adapted to engage the lugs 18 in a position permitting rotation of shafts 19 and 13 in the direction opposite to that in which they are moved to take up excess slack in the brake rigging. A predetermined minimum of slack will consequently result in rotation of the capstan 16 from the position in which it is first engaged by the dog 23 into the position shown in full lines in Figure 4.

Secured to the upper end of the live lever is a plate or the like 24 so that, when the links of the chain constituting the pull rod 5 drop down as when the brakes are released, the plate 24 will permit the pull rod to move upwardly into its normal operating position when the brakes are applied. In other words, there will be no underhanging of pull rod 5 on the upper end of the live lever 1 and the pull rod will, therefore, not interfere with the operation of the live lever.

Chain 12 is connected to shaft 13 by a bolt 25 having a head 26 and a nut 27 screw threaded thereon. After the bolt is properly assembled with chain 12 and shaft 13, its end may be advantageously peened over to prevent nut 27 from rotating off the bolt.

In operation of the device here disclosed it has been found that once the brakes are set the upper end of the dead lever does not move relatively to other parts of the car truck.

Various modifications may be made in the specific details and arrangement of parts herein shown without departing from the spirit and scope of the invention as defined in the appended claims.

What I claim is:

1. The combination in a brake rigging for a railway car having a truck provided with a bolster pivotally connected to a body bolster of the underframe of the car, of live and dead levers pivotally mounted on respectively opposite sides of the truck bolster, a fulcrum lever for imparting a braking force to said live and dead levers, a member mounted on the under-side of the body bolster, a pair of sheaves carried by said member and a pair of chains, each chain being passed around one of said sheaves, said chains constituting the means through which a braking force is delivered to the live lever from said fulcrum lever and through which said dead lever is deaded.

2. The combination in a brake rigging for a railway car having a truck provided with a bolster pivotally connected to a body bolster of the underfrace of the car, of live and dead levers pivotally mounted on respectively opposite sides of the truck bolster, a fulcrum lever for imparting a braking force to said levers, a housing fixed to the under-side of the body bolster, a pair of sheaves carried by said housing a chain passing around one of said sheaves connected at one end to the live lever and at its other end to said fulcrum lever, and another chain passing around the other sheave and connected at one end to the dead lever and at its other end to the underframe of the car.

3. The combination in a brake rigging for a railway car having a truck provided with a bolster pivotally connected to a body bolster of the underframe of the car, of live and dead levers pivotally mounted on respectively opposite sides of the truck bolster, a fulcrum lever for imparting a braking force to said levers, a pair of sheaves mounted on the under-side of the body bolster, a shaft extending transversely of the car and carried by said body bolster, a chain passing around one of said sheaves connected at one end to the live lever and at its other end to said fulcrum lever, and another chain passing around the other sheave and connected at one end to the dead lever and at its other end to said shaft.

4. The combination in a brake rigging for a railway car having a truck provided with a bolster pivotally connected to a body bolster of the underframe of the car, of a fulcrum lever for imparting a braking force to the truck levers, a pair of sheaves mounted on the under-side of the body bolster, and a fixed housing having open mouths in which said sheaves are rotatably mounted, and flexible means passing around said sheaves for imparting to said truck levers a braking force applied through said fulcrum lever.

5. The combination in a brake rigging for a railway car having a truck provided with a bolster pivotally connected to a body bolster of the underframe of the car, of live and dead levers pivotally mounted on respectively opposite sides of the truck bolster, a fulcrum lever for imparting a braking force to said levers and located above an upper end of the live lever, a flexible member connecting said fulcrum lever and said live lever and connected to an upper end of said live lever, and means secured to the upper end of and rigid with the live lever and projecting beyond opposite sides thereof for deflecting and rigid therewith for preventing said member from interfering with movement of said live lever in a brake applying direction.

6. In braking rigging of a railway car, the combination with a lever and flexible means partly overlying and connected to an upper end of said lever for imparting a braking force thereto, of a plate-like member rigidly secured to the upper end of said lever and projecting beyond opposite sides thereof for deflecting said flexible means from the brake-applying path of said lever.

References Cited in the file of this patent

UNITED STATES PATENTS

| Number | Name | Date |
|---|---|---|
| 135,212 | Elder | Jan. 28, 1878 |
| 465,266 | Hinckley | Dec. 15, 1891 |
| 668,360 | Stevens | Feb. 19, 1901 |
| 1,073,390 | Byrd | Sept. 16, 1913 |
| 1,192,420 | Harter et al. | July 25, 1916 |
| 1,417,203 | Redford | May 23, 1922 |
| 1,734,832 | Shanklin | Nov. 5, 1929 |
| 1,879,668 | Farmer | Sept. 27, 1932 |
| 1,983,193 | Sauvage | Dec. 4, 1934 |
| 2,215,239 | Baselt | Sept. 17, 1940 |